United States Patent
Reepmeyer et al.

(10) Patent No.: US 11,061,414 B2
(45) Date of Patent: Jul. 13, 2021

(54) FLEET MISSION ADVISOR

(71) Applicant: General Electric Company, Schenectady, NY (US)

(72) Inventors: James Ryan Reepmeyer, Cincinnati, OH (US); Eric Richard Westervelt, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 15/848,693

(22) Filed: Dec. 20, 2017

(65) Prior Publication Data
US 2019/0187727 A1 Jun. 20, 2019

(51) Int. Cl.
| | | |
|---|---|---|
| *G05D 1/10* | (2006.01) | |
| *G07C 5/08* | (2006.01) | |
| *G08G 5/00* | (2006.01) | |
| *B64C 39/02* | (2006.01) | |
| *F41H 13/00* | (2006.01) | |
| *G06Q 50/30* | (2012.01) | |

(52) U.S. Cl.
CPC .............. *G05D 1/104* (2013.01); *B64C 39/02* (2013.01); *G07C 5/0808* (2013.01); *G07C 5/0816* (2013.01); *G08G 5/003* (2013.01); *F41H 13/0043* (2013.01); *G06Q 50/30* (2013.01)

(58) Field of Classification Search
None
See application file for complete search history.

(56) References Cited

U.S. PATENT DOCUMENTS

| | | |
|---|---|---|
| 4,130,863 A | 12/1978 | Schweitzer et al. |
| 4,159,088 A | 6/1979 | Cosley |
| 5,408,413 A | 4/1995 | Gonser et al. |
| 6,618,631 B1 | 9/2003 | Johnson et al. |
| 6,732,063 B2 | 5/2004 | Famili et al. |
| 6,823,253 B2 | 11/2004 | Brunell |
| 7,751,948 B2 | 7/2010 | Boorman et al. |
| 8,086,387 B2 | 12/2011 | Bradley et al. |
| 8,340,948 B1 | 12/2012 | Song et al. |
| 8,417,361 B2 | 4/2013 | Kumar et al. |

(Continued)

OTHER PUBLICATIONS

Davies, Steve; "General Dynamics F-16 Fighting Falcon Owners' Workshop Manual 1978 onwards (all marks)", pp. 76-77 (Year: 1988).*

(Continued)

*Primary Examiner* — Dale W Hilgendorf
*Assistant Examiner* — Alexander C. Bost
(74) *Attorney, Agent, or Firm* — Dority & Manning, P.A.

(57) ABSTRACT

A fleet mission control system for a network of aerial vehicles including power thermal management systems is provided. According to examples of the disclosed technology a control system receives one or more mission objectives for a network of aircraft including two or more aerial vehicles. Each aerial vehicle includes a power-thermal management system. The control system receives system state information for the network of aircraft. The system state information includes PTMS state data. The control system determines a set of aircraft commands for the network of aircraft based on the one or more mission objectives and the PTMS state data, and generates an output signal based on the set of aircraft commands.

20 Claims, 7 Drawing Sheets

(56) References Cited

U.S. PATENT DOCUMENTS

| | | |
|---|---|---|
| 8,694,184 B1 | 4/2014 | Boorman et al. |
| 8,843,250 B2 | 9/2014 | Tucker et al. |
| 8,868,262 B2 | 10/2014 | Haillot |
| 8,868,284 B2 | 10/2014 | Isom et al. |
| 8,990,101 B2 | 3/2015 | Nicosia |
| 9,038,939 B2 | 5/2015 | Dyrla et al. |
| 9,117,368 B2 | 8/2015 | Agarwal et al. |
| 9,205,916 B2 | 12/2015 | Boorman et al. |
| 9,354,621 B2 | 5/2016 | Westervelt et al. |
| 9,355,564 B1* | 5/2016 | Tyson .................. G08G 5/0008 |
| 9,534,538 B1 | 1/2017 | Cerny |
| 9,683,913 B2* | 6/2017 | Munger ................ G01M 7/025 |
| 2007/0055392 A1 | 3/2007 | D'Amato et al. |
| 2010/0024536 A1 | 2/2010 | Adibhatla et al. |
| 2010/0036540 A1 | 2/2010 | Vian et al. |
| 2010/0057511 A1* | 3/2010 | Mansouri ......... G06Q 10/06311 |
| | | 705/7.13 |
| 2011/0190963 A1 | 8/2011 | Glassl et al. |
| 2012/0245747 A1 | 9/2012 | Kumar et al. |
| 2015/0151845 A1 | 6/2015 | Jones |
| 2015/0234951 A1* | 8/2015 | Andersson .............. G06F 17/18 |
| | | 703/2 |
| 2015/0316352 A1* | 11/2015 | Eriksson ................... F41G 9/00 |
| | | 89/1.11 |
| 2016/0163209 A1 | 6/2016 | Zhou et al. |
| 2016/0176526 A1 | 6/2016 | Becker et al. |
| 2016/0340059 A1 | 11/2016 | Pettre |
| 2016/0342930 A1 | 11/2016 | Tucker et al. |
| 2017/0043884 A1* | 2/2017 | Bedin .................... G07C 5/008 |
| 2017/0371328 A1* | 12/2017 | Waddington ........ G05B 23/0218 |
| 2018/0047224 A1* | 2/2018 | Clark, IV ............... G07C 5/008 |
| 2018/0047295 A1* | 2/2018 | Ricci ...................... G05D 1/104 |
| 2018/0096609 A1* | 4/2018 | de la Cruz ........... G08G 5/0013 |
| 2018/0210466 A1* | 7/2018 | Weaver .................... G08G 5/00 |
| 2018/0288080 A1* | 10/2018 | Keller ................. H04L 63/1425 |
| 2018/0362190 A1* | 12/2018 | Chambers ............. G07C 5/0866 |
| 2019/0041851 A1* | 2/2019 | Ortiz .................... G05D 1/0077 |
| 2019/0051065 A1* | 2/2019 | Adams ................. G07C 5/0816 |
| 2019/0063881 A1* | 2/2019 | Abramov .............. B64C 39/024 |
| 2019/0088047 A1* | 3/2019 | Frewen .................. G06Q 10/20 |

OTHER PUBLICATIONS

U.S. Appl. No. 15/609,974, filed Dec. 12, 2017.

* cited by examiner

FLEET MISSION ADVISOR

FIELD

The present disclosure relates generally to aerial vehicles.

BACKGROUND

An aerial vehicle can rely on one or more engines such as jet turbine engines, turbofan engines, turbojet, electric and hybrid-electric engines to control the aerial vehicle.

There is a move toward a More Electric Aircraft (MEA) for both commercial and military aircraft. The MEA trend describes the rapid increase in demand for on-board electric power (for countermeasures, jamming, directed energy weapons, electric actuation, climate regulation, onboard computation, and/or hybrid-electric propulsion, etc.). For military aircraft, MEA benefits are not only used for increased range, but may also translate into increased capability. A power-thermal management system (PTMS) may be used to address various aircraft system heat loads. With increased demand for on-board electric power, it may be increasingly difficult to manage the tradeoffs that exist between different objectives of the PTMS.

BRIEF DESCRIPTION

Aspects and advantages of the disclosed technology will be set forth in part in the following description, or may be obvious from the description, or may be learned through practice of the disclosure.

According to example embodiments of the disclosed technology there is provided a system, comprising one or more processors, and one or more memory devices. The one or more memory devices store computer-readable instructions that when executed by the one or more processors cause the one or more processors to perform operations. The operations comprise receiving one or more mission objectives for a network of aircraft including two or more aerial vehicles. Each aerial vehicle includes a power-thermal management system (PTMS). The operations further comprise receiving system state information for the network of aircraft. The system state information includes PTMS state data. The operations further comprise determining a set of aircraft commands for the network of aircraft based on the one or more mission objectives and the PTMS state data, and generating one or more output signals based on the set of aircraft commands.

According to example embodiments of the disclosed technology there is provided a computer-implemented method of aircraft thermal management that comprises receiving, by one or more processors, a shared mission objective for a network of aircraft including two or more aerial vehicles. Each aerial vehicle includes a power-thermal management system. The method further comprises receiving, by the one or more processors for each of the two or more aerial vehicles, system state information including power thermal management system (PTMS) data. The method further comprises determining, by the one or more processors for each of the two or more aerial vehicles, one or more reference commands based on the shared mission objective and the system state information. The method further comprises transmitting, by the one or more processors to the network of aircraft, one or more signals identifying the one or more reference commands.

According to example embodiments of the disclosed technology there is provided a non-transitory computer-readable medium storing computer instructions, that when executed by one or more processors, cause the one or more processors to perform operations. The operations comprise receiving one or more shared mission objectives for a network of aircraft including two or more aerial vehicles. Each aerial vehicle includes a power-thermal management system. The operations further comprise receiving system state information for the network of aircraft including state information for the two more aerial vehicles. The operations further comprise determining a set of aircraft objectives for the network of aircraft based on the one or more shared mission objectives and the system state information. The set of aircraft objectives include, for at least one of the two or more aerial vehicles, a PTMS objective based on the one or more shared mission objectives for the network of aircraft. The operations further comprise generating an output signal based on the set of aircraft objectives.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
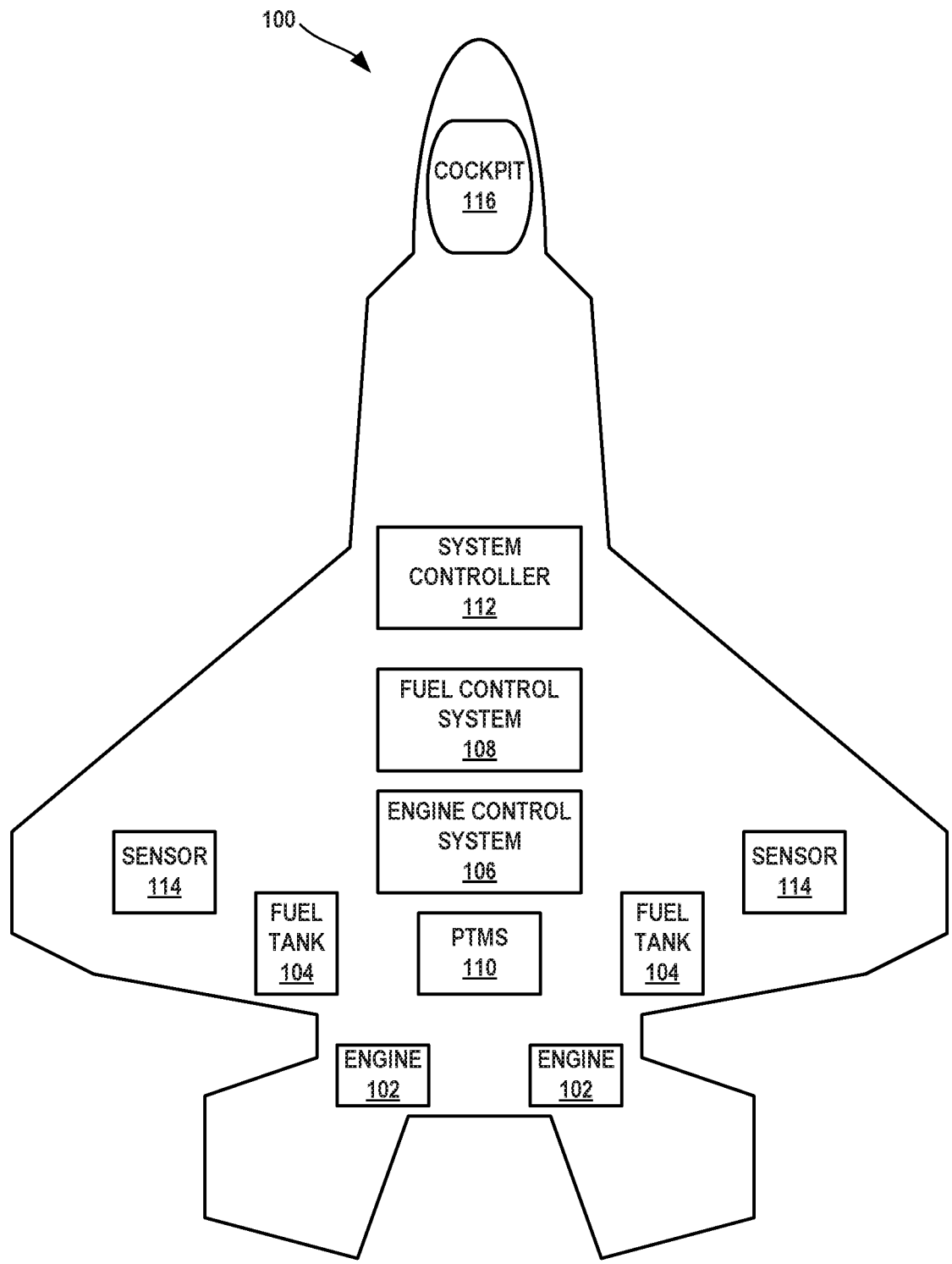
FIG. 1 depicts a block diagram of an example of an aerial vehicle in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems and methods for managing a network of aerial vehicles, and more particularly, to systems and methods for optimizing aerial vehicles including power thermal management systems to achieve a shared mission objective. According to example embodiments, a fleet mission advisor computing system is provided that is configured to generate aircraft commands, also referred to as aircraft objectives, for individual aerial vehicles in a network of aerial vehicles in order to accomplish one or more shared mission objectives. The one or more shared mission objectives may apply to a single flight mission, or multiple flight missions. The fleet mission advisor may receive one or more shared mission objectives and information associated with the state of the network of aircraft. Based on the shared mission objectives and the state of the network, the fleet mission advisor can generate mission plans including aircraft commands for different aerial vehicles in the fleet. In example embodiments, the advisor may consider the power thermal management systems aboard individual aircraft as part of generating mission plans.

According to example embodiments of the disclosed technology, a fleet mission advisor is configured to generate one or more mission plans for a network (also referred to as fleet) of aircraft with power-thermal management systems (PTMS). The one or more mission plans are generated in response to one or more mission objectives including a common goal or set of goals for the network. Each aerial vehicle in the network includes one or more power-thermal management systems, each with variable thermodynamic conditions. The fleet mission advisor is configured to determine a PTMS state associated with each aerial vehicle in the network. The fleet mission advisor then can generate one or more mission plans based on the PTMS state of the individual aircraft. In various embodiments, the PTMS state may include a past state of the PTMS, a current state of the PTMS, and/or a predicted state of the PTMS.

In some embodiments, a fleet mission advisor (FMA) is configured to generate a mission plan including a set of aircraft objectives or commands for a network of PTMS-enabled aerial vehicles. The FMA is configured to analyze the network of aerial vehicles and generate a mission plan to accomplish one or more predetermined mission objectives for the network of aerial vehicles. For example, the FMA can determine system state information such as PTMS state information for each aircraft in the network. The FMA can determine a set of aircraft commands for the network in order to optimize a mission objective based on the PTMS state information for each aerial vehicle of the network. In order to generate mission plans for a network of PTMS-enabled aerial vehicles, the optimizer may generate an aircraft command for a first aerial vehicle of the network based on a second aerial vehicle of the network. Such commands may include degrading one aerial vehicle's capabilities in order to gain an overall network-based advantage.

In some embodiments, the fleet mission advisor (FMA) generates a plurality of mission plans in response to one or more shared mission objectives. Each mission plan includes a set of aircraft commands. The plurality of sets of aircraft commands can be provided to a human operator such as a fleet coordinator and/or to other computing components. By way of example, the FMA can generate one or more output signals for a display or for transmission to other computing devices or systems to provide the plurality of mission plans. The FMA can receive an indication of a selected set of aircraft commands by a fleet coordinator or another computing component. The FMA can transmit one or more selected mission plans to the network or aerial vehicles. In some embodiments, the FMA can transmit one or more aircraft commands to each aerial vehicle in the network. In some embodiments, the one or more aircraft commands for each aerial vehicle can include one or more reference commands. Each aerial vehicle can use the one or more reference commands to optimize the aerial vehicle's performance and/or to affect the one or more shared mission objectives. For example, the aerial vehicle may generate aircraft operations or aircraft input commands based on the reference command(s). The aerial vehicle may be manned or unmanned.

In some embodiments, the fleet mission advisor is configured to use system state information and mission objective information to generate a set of mission plans or options for a fleet coordinator, with each mission plan including a set of aircraft commands for each aircraft in the network. The advisor can generate each of the mission plans based on a set of target features such as fuel consumption, oil consumption, flight range, probability of success of mission objective, or thermal heat sink availability for use of high electric load systems. In some examples, the advisor can provide to the fleet coordinator each mission plan along with mission feature information such as fuel consumption, flight range, probability of mission objective success, and/or heat sink availability. In other examples, the advisor automatically determines an optimal mission plan which is transmitted to the fleet of aircraft.

In some embodiments, the fleet mission advisor is configured to determine other system state information for the network of aircraft such as engine state information, aircraft state information, environmental state information, and/or threat conditions, etc. in addition to PTMS state information. The fleet mission advisor can generate the one or more mission plans based on this additional system state information.

In some embodiments, each mission option may include a corresponding modification of adaptive sub-systems of each aircraft in the network in order to generate the mission plan. By way of example, the advisor may determine modifications to sub-system features such as the power supply/generation split between multiple sources, the prioritization of heat sink use, etc. Moreover, the advisor may determine that the aircraft objective of an individual aerial vehicle should be modified for a particular mission option.

According to example embodiments of the disclosed technology, the fleet mission advisor may receive updated system state information and generate one or more updated mission plans. In some examples, the updated mission plans can be generated after an initial mission plan has been communicated to the network of aerial vehicles. By way of example, the advisor can calculate one or more updated mission plans and provide those to a fleet coordinator. The fleet coordinator can select a particular updated mission plan. The advisor can generate one or more output signals transmitting updated aircraft objectives to the individual aircraft in the fleet.

The systems and methods of the present disclosure provide a number of technical effects and benefits, particularly in the area of computing technology. As one example, the techniques described herein enable a computing system to generate mission plans for a fleet of aircraft in order to achieve a common goal or set of goals. More particularly, the techniques described herein enable a computing system to determine system state information including power-thermal state information of individual aerial vehicles in a fleet of PTMS-enabled aircraft. The computing system can receive one or more mission objectives for the fleet and automatically generate one or more mission plans to accomplish the mission objective based on the system state information. In this manner, the fleet of aerial vehicles can be more accurately and efficiently operated and managed to achieve a common goal. Additionally, a computing system can more efficiently analyze state information to determine individual commands for operating individual aerial vehicles in the fleet to achieve a mission objective.

As one example, the techniques described herein enable a computing system to generate re-optimized mission plans in-flight during operation of a network of aircraft. The computing system can receive updated system state information during a fleet mission and recalculate aircraft objectives in order to maintain achievement of the mission objective. In this manner, a computing system in accordance with embodiments of the disclosed technology may provide for more efficient operation of a fleet of aircraft. Moreover, the computing system may enhance the safety and probability of mission success for aircraft.

FIG. 1 depicts a block diagram of an aerial vehicle 100 according to example embodiments of the present disclosure. FIG. 1 depicts a specific type of aerial vehicle by way of example only. It will be appreciated that the disclosed technology may be used with any type of manned or unmanned aerial vehicle. Embodiments of the disclosed technology have applicability to aerial vehicles including rotorcraft (e.g., helicopters) and aircraft (e.g., airplane), as well as mixed fleets including multiple types of aerial vehicles. Embodiments of the disclosed technology may have applicability to private, commercial, and military aircraft.

The aerial vehicle 100 can include one or more engines 102 and one or more fuel tanks 104 for storing aircraft fuel. The one or more engines 102 can cause operations, such as propulsion, of the aerial vehicle 100. An engine 102 can be a gas turbine engine such as a jet turbine engine, turboprop engine, turbofan engine, a turbo shaft engine, or any other suitable engine. A gas turbine engine can include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial or centripetal compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The aerial vehicle 100 can include an engine control system 106 including one or more engine controllers. For example, engine control system 106 may include an electronic engine controller (EEC) for each engine 102 in some embodiments. In other examples, engine control system 106 may include a Full Authority Digital Engine Control (FADEC) system. A FADEC system is often used for modern aerial vehicles because the FADEC system dynamically controls the operation of each gas turbine engine and requires minimal, if any, supervision from the pilot. The aerial vehicle 100 of FIG. 1 additionally includes a fuel control system 108 including one or more fuel controllers configured to control fuel flow for the one or more engines 102 or between fuel tanks 104 or PTMS 110.

The engine control system 106 may generally include one or more processor(s) and associated memory configured to perform a variety of computer-implemented functions, such as various methods, steps, calculations and the like disclosed herein. Additionally, the fuel control system may include one or more processor(s) and associated memory configured to perform a variety of computer-implemented functions. In some examples, the engine control system 106 and/or fuel control system 108 may be programmable logic devices, such as a Field Programmable Gate Array (FPGA), however they may be implemented using any suitable hardware and/or software. In some implementations, an integrated fuel, PTMS, and engine control system can be used.

The aerial vehicle 100 may include a power-thermal management system (PTMS) 110. In one or more embodiments, the PTMS may be an Integrated Propulsion Power Thermal Management System (IPPTMS), having a PTMS integrated within one or more engines of the aerial vehicle. An IPPTMS may include and be powered by one or more engines 102. In one or more other embodiments, the PTMS may be separate from the one or more engines 102. The PTMS additionally may serve as an environmental control system (ECS) to provide cooling for liquid and air cooled aircraft components and equipment, as well as thermal control and pressurization for a cockpit 116. It is noted that a cockpit is not required, for example, in unmanned aerial vehicle embodiments. The PTMS provides available heat sinks, including fuel (e.g., burned, bypassed, or used as cold storage), ram air, and engine bypass flow streams. Each of these may be considered in order to effectively manage aerial vehicle thermal loads as described herein.

In some embodiments, the aerial vehicle may include a system controller 112. The system controller may generally include one or more processor(s) and associated memory configured to perform a variety of computer-implemented functions. In some examples, the system controller may control operation of the PTMS 110. The system controller may optionally control the one or more engines 102, alone or in combination with the engine control system 106. Thus, some embodiments may include a single system controller 112 without an additional engine control system 106 and/or fuel control system as depicted in FIG. 1.

The term "processor" may generally refer to integrated circuits, and may also refer to a controller, microcontroller, a microcomputer, a programmable logic controller (PLC), an application specific integrated circuit (ASIC), a Field Programmable Gate Array (FPGA), and other programmable circuits. Additionally, the memory described herein may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Any one or a combination of the engine control system 106, fuel control system 108, and system controller 112 may also include a communications interface. The communications interface can include associated electronic circuitry that is used to send and receive data. More specifically, the communications interface can be used to send and receive data between any of the engine control system 106, fuel control system 108, and system controller 112. Similarly, a communications interface at any one of the controllers may be used to communicate with outside components such as another aerial vehicle and/or ground control. A communications interface may be any combination of suitable wired or wireless communications interfaces.

The aerial vehicle 100 can additionally include one or more sensors 114. The one or more sensors 114 can be used to detect one or more parameters related to the engine(s) 102, aerial vehicle 100, atmosphere external to the aerial vehicle, and/or PTMS 110. The one or more sensors 114 can communicate the one or more detected parameters to any one of the engine control system 106, fuel control system 108, and/or system controller 112. In some implementations, the one or more sensors and/or one of the controllers can communicate parameters to one or more external components.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
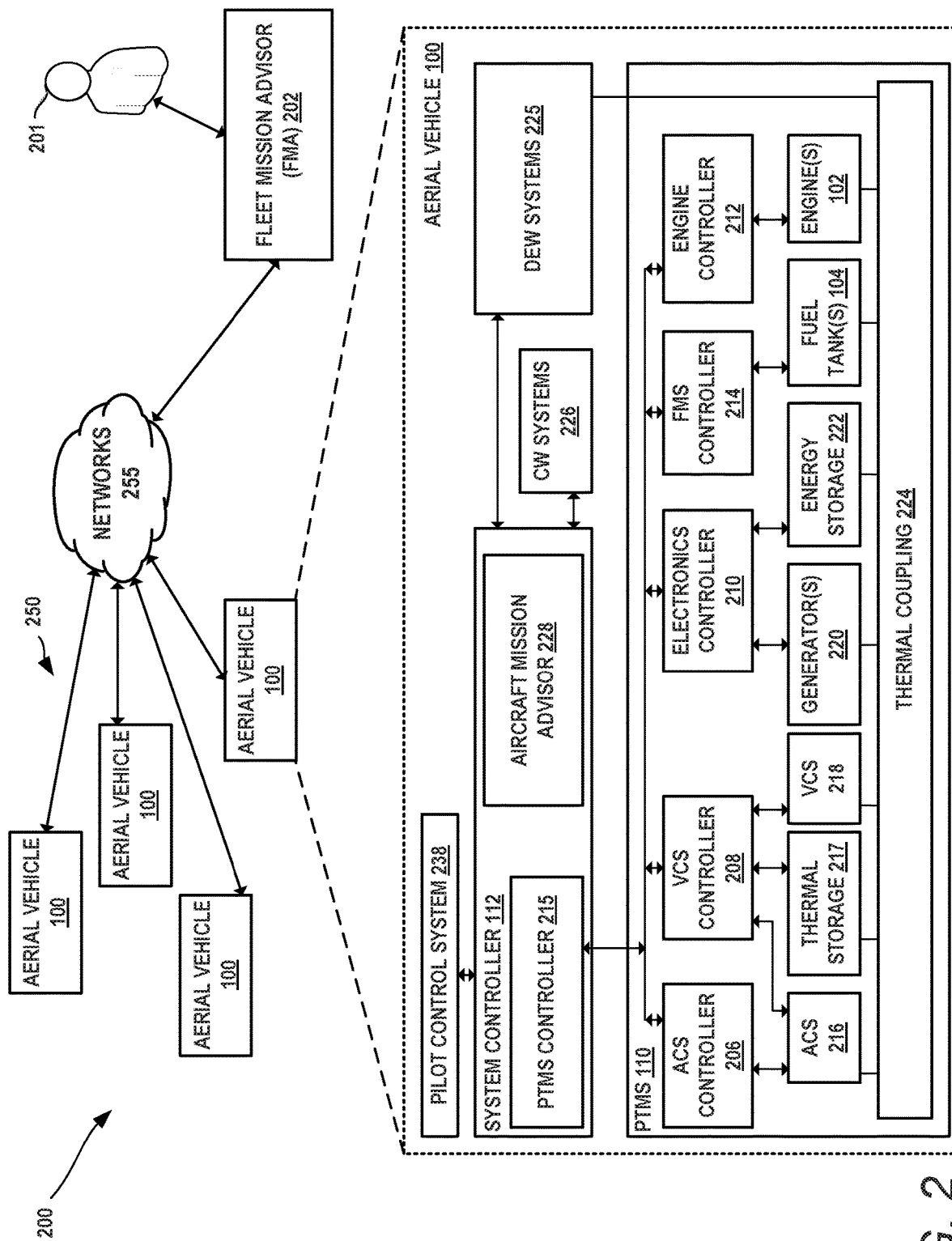
FIG. 2 depicts a block diagram of a fleet mission control system in accordance with example embodiments of the present disclosure, illustrating a network of aerial vehicles having power-thermal management systems.

FIG. 2 is a block diagram depicting a fleet mission control system 200 in accordance with example embodiments of the disclosed technology. More particularly, the fleet mission control system 200 includes an aircraft network (also referred to as fleet) 250 of two or more aerial vehicles 100, a fleet mission advisor (FMA) 202, and a fleet coordinator 201 in communication over one or more communication networks 255. The term fleet or network in reference to a group of aircraft may refer to a temporary or permanent grouping of two or more aerial vehicles to achieve one or more common goals. The one or more common goals may be referred to as a fleet objective, or more particularly a fleet mission objective in reference to one or more shared objectives of the aircraft grouping. Furthermore, the aerial vehicles of the network typically can communicate over the communication network(s) 255. The fleet coordinator 201 is optional as the disclosed technology may be implemented without human intervention in example embodiments.

Communication network 255 may include any number and type of suitable network for the exchange of information. By way of example, communication network 255 may include one or more of a Local Area Network ("LAN"), a Metropolitan Area Network ("MAN"), a Wide Area Network ("WAN"), an ARINC 429, MIL-STD-1553, IEEE-1394, a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Communication network(s) 255 may include terrestrial and/or satellite-based networks. Note that any devices described herein may communicate via one or more such communication networks.

According to some implementations, fleet mission advisor 202 is configured to generate one or more mission plans for the fleet of aerial vehicles 100 based on one or more mission objectives, and system state information relating to the individual aircraft of the fleet. Examples of mission objectives include, but are not limited to, distance, altitude, engagement plans, speed targets, or thrust targets.

Fleet mission advisor 202 can utilize state information relating to the aircraft to optimize a mission plan for the fleet to achieve the mission objective. The fleet mission advisor 202 may further optimize mission plans for the fleet in order to achieve other objectives, such as long-term health objectives for the fleet in order to maintain the fleet at an optimal performance level over multiple missions. By way of example, the fleet mission advisor 202 may generate mission plans based on maximizing a remaining useful life of one or more aircraft and/or aircraft components.

In accordance with example embodiments, the fleet mission advisor may generate a plurality of mission plans in response to a mission objective. The plurality of mission plans may be presented to a fleet coordinator 201 in some examples, using a display or other communication interface, who can then select particular mission plan. The mission plans may be presented with feature information, including information such as mission success probability, aircraft performance, etc. associated with the mission plan. The fleet coordinator may be remote from the fleet of aircraft or may be local to the fleet of aircraft, such as by being located within one of the aerial vehicles of the fleet.

In some examples, a mission plan includes a set of aircraft objectives. The set of aircraft objectives includes at least one aircraft objective for each aerial vehicle in the fleet. The fleet mission advisor is configured to generate the set of aircraft objectives, based on optimizing the overall mission objective given the system state of each aerial vehicle in the network in some implementations. In this manner, the fleet mission advisor may automatically generate an aircraft objective for a first aerial vehicle in a fleet based at least in part on a system state of at least one additional aerial vehicle in the fleet.

The output of the advisor for each aircraft objective of the mission plan may include a reference command. By way of example and not limitation, the reference commands may include a flight path, target destination, electronic or directed energy weapon use and preparedness, etc. In some embodiments, each aerial vehicle can use a reference command to optimize the vehicle's performance and to affect the desired outcome of the aircraft objective.

In some implementations, the fleet mission advisor is configured to communicate one or more aircraft objectives to each of the aerial vehicles 100 in the network based on a selected mission plan. The fleet mission advisor 202 can send one or more signals to each aerial vehicle, with the signal(s) for each aerial vehicle including one or more aircraft objectives associated with each aerial vehicle.

According to some embodiments, the system controller 112 at each aerial vehicle includes an aircraft mission advisor 228. In some examples, the aircraft mission advisor is configured to receive the one or more aircraft commands. In some embodiments, the one or more aircraft commands can be presented to the pilot, via a display associated with the pilot control system 238 for example. In some implementations, the aircraft mission advisor 228 can process the one or more aircraft commands to generate one or more aircraft operations or provide one or more aircraft input commands. For example, the aircraft mission advisor may be configured to optimize a set of pilot and/or automated input commands in accordance with a reference command. The aircraft mission advisor may use local and real-time information of the aerial vehicle to generate an optimal set of input commands based on the one or more aircraft objectives. In some implementations, the aircraft mission advisor can provide a set of mission plans to the pilot and/or the pilot control system which then can select a particular one of the mission plans from the set.

The PTMS 110 may include one or more connected sub-systems, and may be controlled by one or more PTMS controller(s) 215. As depicted in the example of FIG. 2, PTMS controller 215 is integrated within system controller 112, but this is not required. The PTMS controller 215 is a general PTMS controller in one example, providing high-level control of and interface to the PTMS 110. In another example, PTMS controller 215 may be a part of PTMS 110.

PTMS 110 includes a plurality of sub-systems, including an Air Cycle System (ACS) controller 206, a Vapor Cycle System (VCS) controller 208, an electronics controller 210 (e.g. high-power), an engine controller 212, and a Fuel Management System (FMS) controller 214.

In example embodiments, the air cycle system (ACS) controller 206 may operate an ACS 216, including an air cycle machine, one or more condensers, one or more heat exchangers and/or air valves in some implementations. In example embodiments, the VCS controller 208 may operate a VCS 218. The VCS 218 may include condensers, one or more evaporators, refrigerant valves and/or refrigerant pumps in some implementations.

In example embodiments, the electronics controller 210 may operate a generator 220 and/or energy storage 222. In some implementations, the energy storage 222 may be a battery, capacitor, or other suitable electrical storage.

In example embodiments, the ACS controller 206 and the VCS controller 208 may operate a thermal storage 217. In some implementations, the thermal storage 217 may include coolant and a heat exchanger (e.g., evaporator) to remove heat. In some examples, the thermal storage may include a material (e.g., fluid) that can absorb heat that is not a traditional coolant, such as the jet engine fuel, molten salt, etc.

In example embodiments, the engine controller 212 may operate the one or more engines 102. In example embodiments, the FMS controller 214 may operate the fuel tanks 104, fuel pumps, and/or aircraft fuel valves.

In example embodiments, the PTMS 110 may provide the ability to address adaptively various aircraft system heat loads (e.g., via thermal coupling 224 through air/fuel) by manipulating the control of the one or more of its sub-systems/components via PTMS controller 215. The PTMS controller 215 may include software and/or hardware circuitry that includes and/or is connected with one or more processors (e.g., microprocessors, integrated circuits, field programmable gate arrays, etc.) that perform operations to control the sub-components.

In some instances, it may be ideal that all waste heat may be transferred to the fuel as it is supplied to the engines 102, since the fuel is typically the aircraft's most efficient heat sink. However, increased heat loads combined with decreased fuel burn may result in less fuel thermal capacity. As a result, heat may be removed to the ambient air or engine bypass flow which may cause drag and reduce the benefit of electrification. The PTMS 110 may move heat into the fuel whenever possible, but then direct the heat to the ambient air when more suitable for overall performance. Embodiments provide for the PTMS 110 to calculate different options to move the heat into the fuel, and each option's impact on an aircraft objective.

In example embodiments, an aerial vehicle 100 may include a conventional weapons (CW) systems 226 including missiles and other weaponry. The aerial vehicle may additionally include directed energy weapons systems (DEW) 225. In some implementations, the DEW systems 225 may consume significant electrical energy, and thereby develop significant waste-heat that the PTMS system 110 may then attempt to accommodate. If waste-heat is not sufficiently dissipated, the directed energy weapons systems 225 may overheat, resulting in reduced capability or permanent damage.

The aerial vehicle 100 may also include an aircraft mission advisor 228, in example embodiments. The aircraft mission advisor 228 may provide data to a pilot via a pilot control system 238, the PTMS 110, and/or the weapons system(s) 225, 226.

In example embodiments, the aircraft mission advisor 228 may be located internal to the PTMS 110 or external to the PTMS 110. In FIG. 2, the aircraft mission advisor 228 is external to the PTMS 110 and located in the system controller 112 but this is not required. In example embodiments, the aircraft mission advisor 228 may receive information from at least one of the PTMS 110, via the PTMS controller and weapons systems 225, 226 by at least one of querying the PTMS 110 and the weapons systems 225, 226, respectively, and continually receiving updates from the PTMS 110 and the weapons systems. The aircraft mission advisor may include one or more processing elements, such as a conventional microprocessor, and may operate to control the overall functioning of the aircraft mission advisor 228.

In example embodiments, the aircraft mission advisor 228 may receive requirements and relevant aircraft objectives. Leveraging detailed knowledge of the PTMS 110, the aircraft mission advisor 228 may generate various aircraft mission plans to be received by the pilot and/or pilot control system for selection thereby. The mission plan selected by the pilot and/or pilot control system can be received and executed by the PTMS 110 via manipulation of the sub-systems to control one or more operations of the aerial vehicle 100. In some embodiments, signals received by the PTMS 110, aerial vehicle 100 and other systems may cause modification in the state or condition or another attribute of one or more physical elements of the aerial vehicle 100.

In some embodiments, the aerial vehicle 100 may include a computer data store that may provide information to the aircraft mission advisor 228 and may store results from the aircraft mission advisor 228. Data may be supplied from at least one of the PTMS 110 and the data store to the aircraft mission advisor 228. In some embodiments, the data store may be part of the aircraft mission advisor 228, or the pilot control system.

In some embodiments, the data store may comprise any combination of one or more of a hard disk drive, RAM (random access memory), ROM (read only memory), flash memory, etc. The data store may store software that programs a processor and the aircraft mission advisor 228 to perform functionality as described herein.

Various components of fleet mission control system 200 depicted in FIG. 2, such as fleet mission advisor 202, pilot control system 238, system controller 112, PTMS controller 215, aircraft mission advisor 228, ACS controller 206, VCS controller 208, electronics controller 210, FMS controller 214, and/or engine controller 212, may be implemented as hardware, software, or as a combination of hardware and software. For example one or more of these components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each controller, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor for fleet mission control system 200 to perform the functions described herein. The architecture depicted in FIG. 2 is one example implementation. These various computing-based elements may be configured at a single computing device, or may be distributed across multiple computing devices. Each of the various components may be implemented with hardware, software, or a combination of both hardware and software as hereinafter described. The software may be stored as processor readable code and implemented in a processor, as processor readable code for programming a processor for example.

Figure 3:
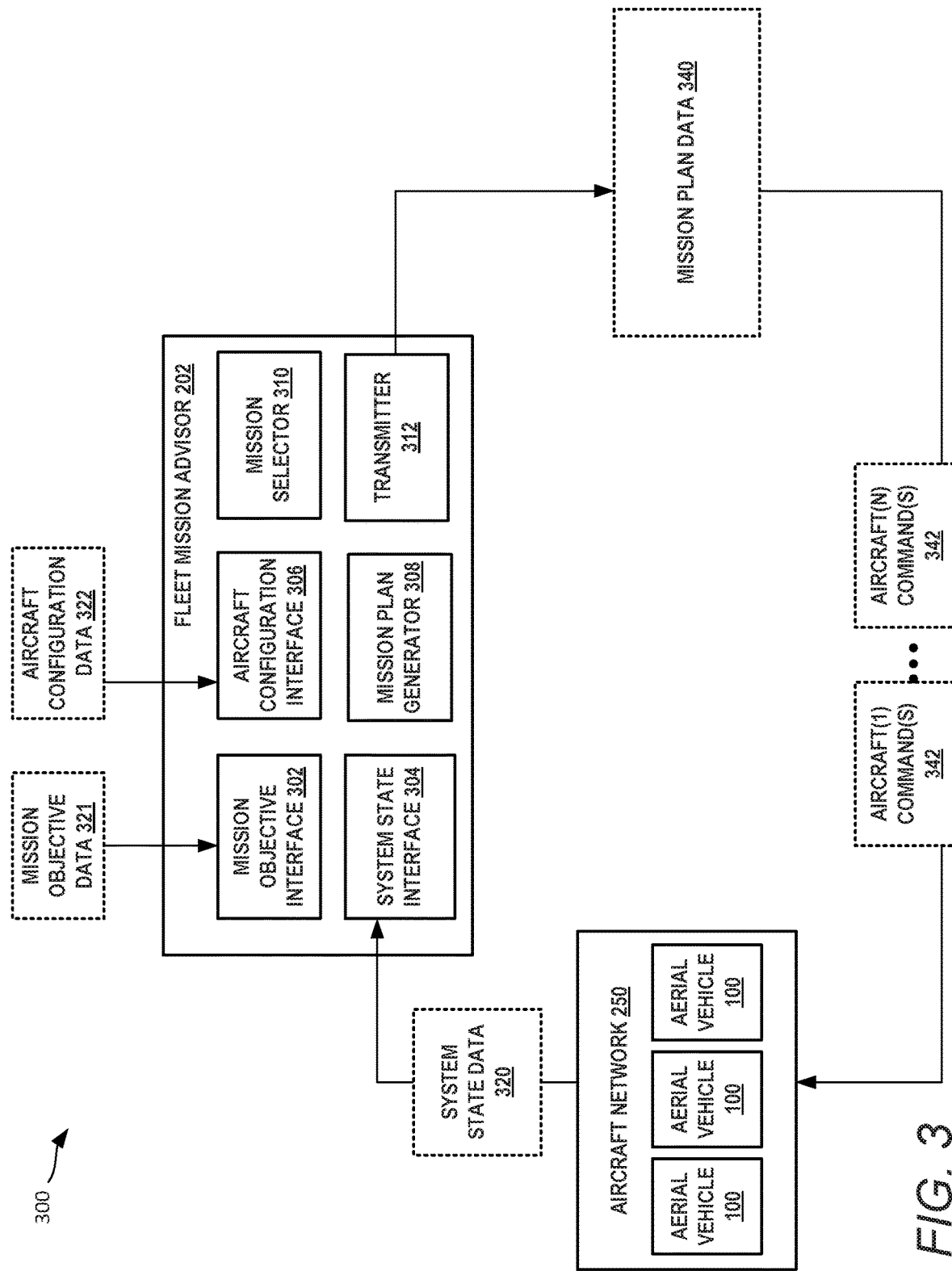
FIG. 3 depicts a block diagram of a fleet mission control system in accordance with example embodiments of the present disclosure, further illustrating the generation and transmission of mission plans to a network of aerial vehicles.

FIG. 3 is a block diagram depicting a fleet mission control system 300 according to example embodiments of the disclosed technology. More particularly, FIG. 3 depicts a flow of data between components of the fleet mission control system 300 in order to generate and transmit fleet-level mission plans for a fleet of aerial vehicles based on one or more shared mission objectives. The fleet mission control system 300 depicted in FIG. 3 includes an aircraft network 250 of aerial vehicles 100, each vehicle including a power-thermal management system (PTMS) as earlier described. The fleet mission control system 300 includes a fleet mission advisor 202 that is configured to generate mission plans for the aircraft network based at least in part on optimizing the PTMS aboard the various aircraft in order to achieve mission objectives. According to embodiments of the disclosed technology, a fleet mission advisor can be implemented as a ground-based computing system, an aerial-based computing system aboard an aerial vehicle of a network of PTMS-enabled aircraft, and/or as an aerial-based computing system aboard an aerial vehicle separate from the network of PTMS-enabled aircraft.

More particularly, FMA 202 includes a system state interface 304, a mission objective interface 302, and an aircraft configuration interface 306. The system state interface 304 is configured to receive system state data from each aerial vehicle in aircraft network 250. In some implementations, the system state data can be received from a system controller 112 or aircraft mission advisor 228 at each of the aerial vehicles. The system state data may include, for example, system state information including engine state information, aircraft state information, environmental state information, and/or PTMS state information related to each aerial vehicle. Examples of engine state information include, but are not limited to, engine speed, engine temperature, fuel flow information, etc. Engine state information may include turbomachinery health/efficiency. Examples of aircraft state information include, but are not limited to, altitude, Mach number, etc. Examples of environmental state information include, but are not limited to, atmospheric state information such as air temperature, air pressure, etc. The FMA may utilize state information such as environmental data to apply the disclosed technology over a life of a fleet of aircraft. For example, the disclosed technology may be used to rotate aircraft within a fleet between hot and cool environments over the life of the aircraft fleet. Examples of power-thermal management system state information include, but are not limited to, heat-sink temperatures, fuel/coolant-flow rates and temperatures, thermal energy storage state and temperature, efficiency, health, etc. In some implementations, the FMA may calculate and/or estimate efficiency and health changes to the fleet.

Additionally, system state information may include state information indicating battle or other in-flight damage, engine and/or PTMS deterioration, and/or updated energy storage (e.g., electrical, chemical, and/or thermal) information during a mission. As described the fleet mission advisor can re-optimize priorities in flight as these and other external factors such as threats to fleet evolve.

The mission objective interface 302 is configured to receive mission objective data 321. Mission objective interface 302 may receive one or more mission objectives via a user interface, manually, and/or through the transmission of one or more signals to the interface. The aircraft configuration interface 306 is configured to receive aircraft configuration data 322. The aircraft configuration data may be stored locally in a database accessible to the aircraft configuration interface, or may be received via a user interface, manually, and/or through the transmission of one or more signals. The aircraft configuration data may include information related to a particular aircraft or aircraft type such as stall margins, minimum thrust, etc.

The fleet mission advisor is configured to generate mission plan data 340 including one or more mission plans to achieve the one or more mission objectives. More particularly, the fleet mission advisor 202 is configured to generate mission plan data 340 for mission objective data 321 including one or more mission plans based on system state data 320 and/or aircraft configuration data 322 associated with the fleet. Mission plan generator 308 can compare the various system state data of the aircraft in the fleet to determine an optimal mission plan for achieving the mission objective(s). In various examples, the mission plan generator 308 may generate the mission plan(s) based on optimizing PTMS capabilities of the aircraft. For example, the mission plan generator 308 may determine that a first aerial vehicle has exhausted its conventional and/or kinetic weapons supply, while a second aerial vehicle has remaining conventional and/or kinetic weapons. The mission plan generator 308 may generate a mission plan to exploit the conventional weapons capability of the second aerial vehicle, while optimizing the first aerial vehicle for deployment of the directed energy weapons which may utilize the PTMS aboard the first aerial vehicle.

It is noted that the system state information may include past system state information, current system state information, and/or predicted system state information. Moreover, the system state information may be updated and change over time. For example, the FMA may be configured to generate one or more first mission plans and provide the mission plans to the fleet for a fleet mission objective. The FMA may be configured to generate one or more second (e.g., updated) mission plans in response to the receipt of updated system state data from one or more aerial vehicles of the fleet after transmitting the one or more first mission plans.

In response to the mission objective(s), state information, and optionally the aircraft configuration information, the FMA generates data for one or more mission plans. Each mission plan can include a set of aircraft commands in order to accomplish the mission objective. In some examples, the FMA generates a set of mission plans. The mission plans can be presented to a fleet coordinator that selects one or more of the mission plans. The FMA may include a mission selector 310 including a user interface or other system for providing mission plans to a fleet coordinator and receiving a selection.

In response to a selected mission plan, the FMA can transmit the selected mission plan data. In some implementations, the FMA includes a transmitter 312 configured to transmit individual aircraft commands to the appropriate aircraft in the fleet. In some embodiments, the FMA transmits the entire mission plan to each aerial vehicle, whereas in other embodiments transmits individual aircraft commands to the appropriate aerial vehicle. FIG. 3 depicts an example with individual aircraft commands 342 transmitted for a mission plan to the appropriate aerial vehicle 100 in the aircraft network 250.

In some embodiments, the aircraft command for each aerial vehicle is an objective or reference command provided a pilot for execution (e.g., via a display of pilot control system 238). In other embodiments, the aircraft command includes a reference command used by the system controller (e.g., aircraft mission advisor) at each aerial vehicle to generate operations or input commands for the aerial vehicle. In some embodiments, the system controller at each aerial vehicle can generate a plurality of options for a particular aircraft command. A pilot can select a particular one of the options. In another example, the system controller can generate an optimized aircraft mission plan based on the received aircraft objective(s).

Figure 4:
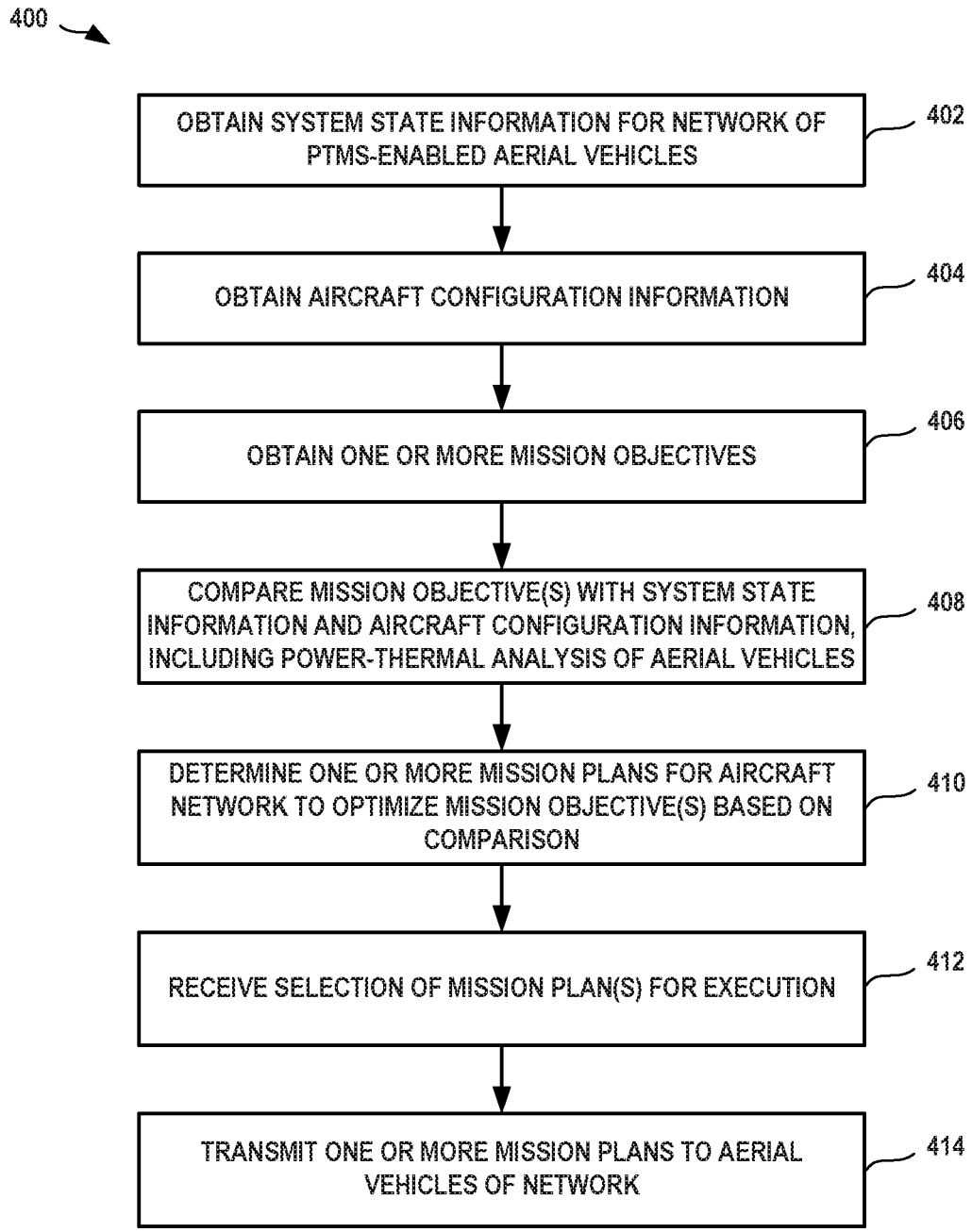
FIG. 4 is a flowchart describing a process of generating mission plans to optimize one or more mission objectives for a network of aerial vehicles in accordance with example embodiments of the present disclosure.

FIG. 4 is a flowchart describing a process 400 of managing a fleet of aircraft, each having a PTMS, in order to achieve a shared mission objective. More particularly, the process 400 may include receiving one or more shared mission objectives and based on state information relating to the fleet of aircraft, generate one or mission plans for the fleet of aerial vehicles. In some implementations, process 400 can be performed by a fleet mission advisor (FMA) 202. The FMA 202 may be an aerial-based FMA aboard one of the aerial vehicles in the fleet or aboard a central command vehicle such as an airborne early warning and control system (AWAC). The FMA 202 may also be a ground-based FMA configured as a stationary or ground-based mobile unit. In another example, the FMA may be hosted by a ship. Additionally, the FMA 202 may be implemented using combinations of these options.

Process 400 may be implemented by one or more servers or other computing devices to determine mission plan data and transmit that data to a fleet of aerial vehicles. Process 400 may be performed by one or more devices, such as one or more circuits or one or more specialized network devices configured to perform the described operations. Process 400 may alternatively be implemented in whole or in part by a processor, as processor readable code for programming a processor for example. Process 400 depicts a particular order of the described blocks for purposes of illustration and discussion. Those of ordinary skill in the art, using the disclosures provided herein, will understand that various blocks of any of the processes disclosed herein can be adapted, modified, rearranged, or modified in various ways without deviating from the scope of the present disclosure.

At (402), system state information is obtained from the network of aerial vehicles. The system state information may be obtained from each of the aerial vehicles in the network or a subset of aerial vehicles in the fleet. The aerial vehicles in the network may report system state information at intervals or in response to events. In some examples, the FMA may request system state information from the network of aerial vehicles. Block 402 may include receiving system state information for the network of aircraft prior to beginning a mission. The system state information may be received while the aerial vehicles are idle or not in operation. Additionally, block 402 may include receiving system state information while the network of aircraft is in-flight. For example, block 402 may include the receipt of updated system state information as the network of aircraft is involved in a mission.

At (404), aircraft configuration information is obtained for the network of aerial vehicles. Block 404 is optional. In some embodiments, the aircraft configuration information includes aircraft configuration data stored locally or at a location accessible to the FMA. The aircraft configuration data may describe a particular aerial vehicle or type of aerial vehicle. The aircraft configuration data may include operating limits or target operating conditions such as stall margins, thrust levels, and the like.

At (406), one or more fleet mission objectives are obtained for the network of aerial vehicles. The fleet mission objectives may include at least one shared goal for the network of aircraft. It is noted the fleet mission objective(s) are not necessarily vehicle specific and thus, need only state an objective for the fleet of aircraft. The FMA is configured to generate from a fleet mission objective a mission plan including individual aircraft objectives to accomplish the overall mission objective.

At (408), the fleet mission objective(s) are compared with the system state information for the individual aircraft, and optionally the aircraft parameters. In example embodiments, FMA 202 can determine the current state of each aerial vehicle and compare those with the one or more mission objectives. Based on the system state information, the FMA can determine the abilities of the individual aerial vehicles to meet tasks associated with achieving the one or more mission objectives. The FMA may utilize current state information as well as predicted state information in order to determine a vehicle's ability to achieve an objective. For example, the FMA may estimate the thermal storage or weapons capacity of an aerial vehicle at a particular point in time of a mission to determine the aerial vehicle's ability to meet an objective. In some implementations, the FMA may exploit the modification of adaptive sub-systems features such as the split between low and high spool power extraction, the prioritization of heat sink use, etc. on each aerial vehicle to generate the possible mission plans.

At (410), one or more mission plans are generated based on the mission objective(s), system state information for the individual aircraft in the network, and optionally, the aircraft configuration information. In example embodiments, block 410 may include determining mission plan features based on optimizing vehicle capabilities. For example, block 410 may include allocating aircraft objectives to particular vehicles based on each vehicle's actual and/or predicted state. In some examples, block 410 may include determining a particular aircraft objective for an aerial vehicle based on the system state information of another aerial vehicle in the fleet. Block 410 may include determining a PTMS objective or command such as a target amount of thermal storage for a particular point in a mission.

Block 410 may include optimizing the mission plans to exploit the resources of individual aircraft. Such optimizations may include optimization of the PTMS of the aerial vehicles, including the individual sub-systems of the aerial vehicles. By way of example, the FMA may generate a mission plan to optimize the amount of thermal storage available to the aerial vehicle at a point in a mission where directed energy weapons are to be used. As another example, the FMA may generate an aircraft objective for one aerial vehicle that includes a faster speed or flight path, resulting in smaller thermal storage capabilities, while another aerial vehicle has an objective that includes lower speeds in order to conserve thermal storage capabilities. In some implementations, generating a mission plan includes generating and/or optimizing a set of plan features. The features can optionally be provided to a fleet coordinator or other computing system. For example, a mission plan may identify features such as fuel consumption, flight range, munitions inventory, thermal heat-sink availability for use of high-power systems and probability of mission success.

At (412), a selection of one or more mission plans is received. For example, the FMA may present a set of mission plans that are generated in response to a set of one or more fleet mission objectives. The FMA may generate a user interface providing an indication of the mission plans for a display of a computing system. Block 414 may include displaying various plan features. The FMA may receive a selection of a particular mission plan via the user interface. A selection of a particular mission plan can be received in any manner. It is noted that in some examples, the FMA may generate a single optimal mission plan that is automatically implemented or presented to a fleet coordinator. Block 412 is optional. In some examples, step 412 is not performed and the FMA selects an optimal mission plan which can be automatically transmitted to the fleet.

At (414), the selected mission plan is transmitted to the network of aerial vehicles. Block 414 may include transmitting one or more aircraft commands to each or a subset of aerial vehicles in the network. The aircraft command is an aircraft objective or reference command in some examples. The aircraft objective can be received by each aerial vehicle and be used to control operation of the aerial vehicle. In some examples, the aircraft objective or command is presented to a pilot or other user of the aerial vehicle. The aircraft objective may permit a range of aircraft operations to achieve the objective. In some examples, options can be presented to the pilot. In other examples, the aircraft objective can be used by an aircraft mission advisor (AMA) aboard the vehicle to determine aircraft operations. For example, the AMA can determine a set of optimal operations using local data or information to achieve the aircraft objective.

Figure 5:
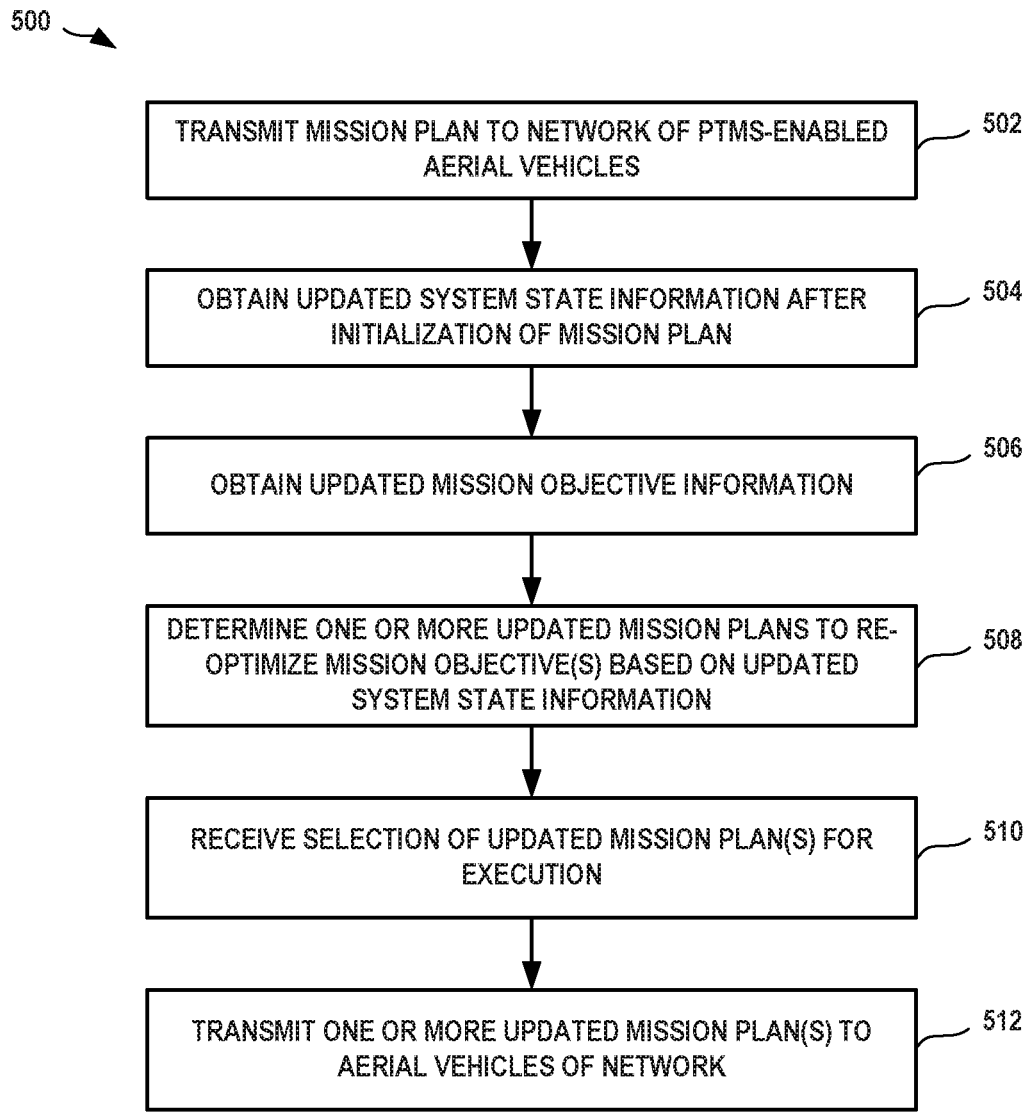
FIG. 5 is a flowchart describing a process of generating updated mission plans to re-optimize one or more mission objectives for a network of aerial vehicles in accordance with example embodiments of the present disclosure.

FIG. 5 is a flowchart describing a process 500 of re-optimization of a mission plan for a network of aircraft having power thermal management systems based on updated system state information. More particularly, process 500 may include receiving system state information while the network of aircraft is in-flight in association with a previously generated mission plan.

At (502), a mission plan including a set of aircraft objectives is sent to a network of aircraft. In some implementations, the FMA may transmit one or more signals to communicate the mission plan to the network. The mission plan may include a set of aircraft commands for the network. The set of aircraft commands can include one or more aircraft commands for each aerial vehicle in the network. Each aircraft command can be associated with a particular one of the aerial vehicles in the fleet which is tasked with completing the aircraft command. In some implementations, the FMA may transmit the complete mission plan to each aerial vehicle in the fleet. In other implementations, the FMA may transmit to each aerial vehicle the one or more aircraft command(s) which are associated with the aerial vehicle.

At (504), updated system state information is obtained after initialization of the mission plan. For example, the mission plan may have been placed into execution by the network, such as by beginning an initial flight path according to the mission plan. In example embodiments, the FMA may receive updated system state information from one or more aerial vehicles in the network. For example, an aerial vehicle may transmit system state information indicating damage to the aerial vehicle, an updated thermal, electrical, and/or chemical storage capacity, etc.

At (506), updated mission objective information may additionally be obtained. For example, the FMA may receive indications of completed aircraft objectives in accordance with the original mission plan. In some examples, the FMA does not receive updated mission objective information.

At (508), one or more updated mission plans are determined for the network of aircraft. In example embodiments, the FMA can analyze the updated system state information to determine a re-optimized set of aircraft commands to accomplish the original mission objective. For example, the FMA may determine that a first aerial vehicle has diminished thermal storage capacity, relative to its thermal storage capacity when the mission began. If the first aerial vehicle was associated with one or more uncompleted aircraft objectives requiring more thermal capability than the aircraft can provide, the FMA may determine a different aerial vehicle with which to associate the objective. For example, the FMA may analyze the system state information to determine another aerial vehicle to which the command can be assigned. Additionally, the FMA may assign a new aircraft command to the first aerial vehicle in accordance with its diminished thermal storage capabilities.

At (510), a selection of one of the updated mission plans is received. For example, the FMA can provide a UI or other communication to display the one or more updated mission plans. The updated mission plan(s) can be provided to a fleet coordinator in some implementations. The fleet coordinator may provide an input to the UI from which the FMA determines a selected mission plan. Block 510 is optional. In some embodiments, block 510 is omitted and the FMA can automatically select an updated mission plan.

At (512), the updated mission plan is transmitted to the network of aerial vehicles. In some embodiments, a new set of aircraft commands can be transmitted to the fleet. In some examples, the FMA can transmit signals including an updated or new aircraft command only to those aerial vehicles having an updated or new aircraft objective under the updated mission plan.

Figure 6:
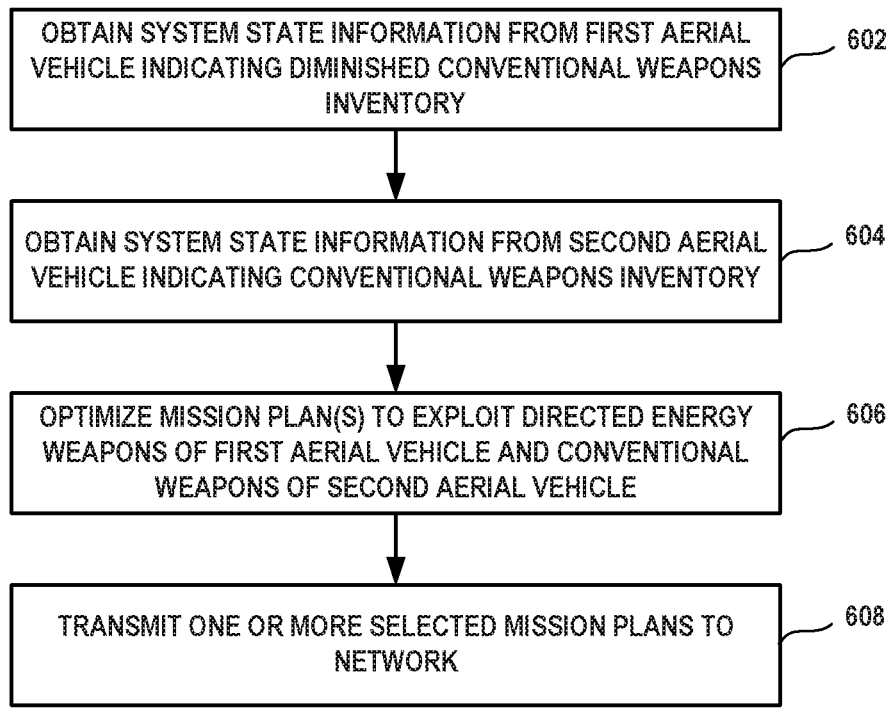
FIG. 6 is a flowchart describing a process of generating mission plans to exploit the power-thermal management systems of a network of aerial vehicles in accordance with example embodiments of the present disclosure.

FIG. 6 is a flowchart describing a process 600 of generating a mission plan in accordance with example embodiments of the disclosed technology. Process 600 describes a specific example of system state information and a mission plan that can be generated to illustrate particular features of the described technology. The described example is provided by way of example, not by way of limitation.

At (602), system state information is obtained from a first aerial in a network of aircraft. The system state information for the first aerial vehicle indicates that the vehicle has a diminished conventional weapons inventory. For example, the system state information may identify a number and type of available weapons for the aerial vehicle. In an example, the system state information may indicate that the first aerial vehicle has less than a full inventory of conventional missiles aboard the vehicle. Additionally, the system state information may indicate that the PTMS of the first aerial vehicle is in working order.

At (604), system state information is received from a second aerial vehicle in the network. The system state information for the second aerial vehicle may indicate that the second aerial vehicle has a full conventional weapons inventory. For example, the system state information may indicate that the second aerial vehicle has a complete supply of conventional missiles.

The system state information received at blocks 602 and 604 may be received prior to beginning execution of an original mission plan, or may be received as updated system state information after beginning execution of the original mission plan.

At (606), one or more mission plans are optimized for the fleet mission objective(s) based on the system state information from blocks 602 and 604. In some implementations, the FMA can analyze the first and second system state information to determine an aircraft command for each aerial vehicle to achieve a mission objective. For example, the FMA may leverage the flexibility of the system to generate an optimal mission plan that exploits the capabilities of each aerial vehicle. In this particular example, the FMA may determine for the first aerial vehicle that an optimized aircraft command is to maximize engine efficiency and range. The engine efficiency may be optimized, for example, by foregoing thermal storage in favor of engine efficiency. The FMA may determine for the second aerial vehicle that an optimized aircraft objective is to increase or provide maximum thermal storage capacity at a point of the mission plan when directed energy weapons are to be used. The FMA may define a shorter and/or slower flight plan for the second aerial vehicle in order to conserve thermal storage so that the directed energy weapons can be engaged at a later time. Accordingly, the FMA at block 606 may be configured to allow a combination of aircraft to accomplish all mission objectives in an optimal manner. In some instances, the FMA may choose to degrade one aircraft's capabilities to gain an overall fleet-based advantage.

At (608), one or more selected mission plans are transmitted to the network of aerial vehicles. The FMA generates one or more signals to communicate the mission plan to the fleet of aerial vehicles as earlier described in some implementations. In some examples, a fleet coordinator can select a mission plan from multiple mission plans generated by the FMA.

Figure 7:
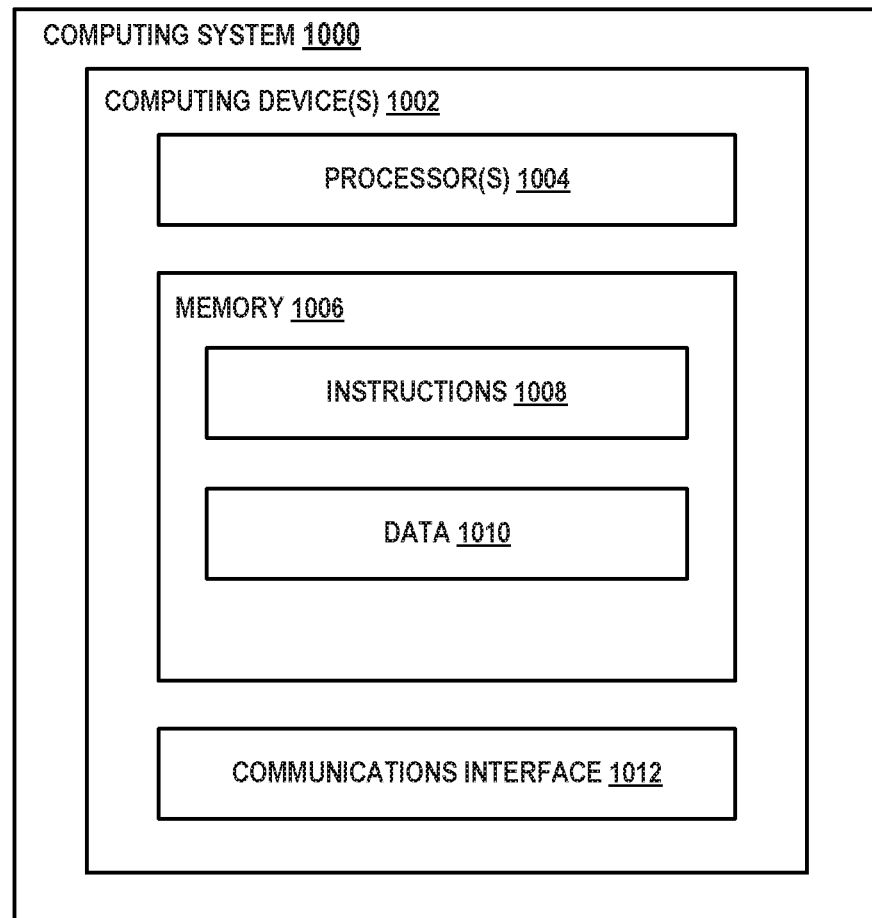
FIG. 7 depicts a block diagram of an example of a computing system.

FIG. 7 depicts a block diagram of an example computing system 1000 that can be used by a fleet mission control system, or other systems to implement methods and systems according to example embodiments of the present disclosure. Computing system 1000 may be used to implement a fleet mission advisor, system controller, etc. as described herein. It will be appreciated, however, that computing system 1000 is one example of a suitable computing system for implementing controllers and other computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for determining mission plans, including the generation of mission plan data as described above, and/or any other operations or functions of the one or more computing device(s) 1002.

The memory device(s) 1006 can further store data 1010 that can be accessed by the processors 1004. For example, the data 1010 can include system state data, aircraft configuration data, mission plan data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
   one or more processors; and one or more memory devices, the one or more memory devices storing computer-readable instructions that when executed by the one or more processors cause the one or more processors to perform operations, the operations comprising:

receiving one or more mission objectives for a network of aircraft including two or more aerial vehicles, each aerial vehicle including a power-thermal management system (PTMS);

receiving system state information for the network of aircraft, the system state information including PTMS state data;

determining a set of aircraft commands for the network of aircraft based on the one or more mission objectives and the PTMS state data, wherein the set of aircraft commands include a target amount of thermal storage for a particular point in a mission where directed energy weapons are to be used for at least one of the aerial vehicles in the network of aircraft; and generating one or more output signals based on the set of aircraft commands.

2. The system of claim 1, wherein the set of aircraft commands, includes for at least one of the two or more aerial vehicles, a PTMS command based on the one or more mission objectives for the network of aircraft.

3. The system of claim 1, wherein:
the one or more mission objectives includes at least one common mission objective to be accomplished by the two or more aerial vehicles; and
the operations further comprise transmitting the one or more output signals to the network of aircraft.

4. The system of claim 3, wherein determining the set of aircraft commands comprises:
determining a thermal energy storage state for a first aerial vehicle of the two or more aerial vehicles; and
determining a particular aircraft command for a second of the two or more aerial vehicles based on the thermal energy storage state of the first aerial vehicle.

5. The system of claim 1, wherein determining the set of aircraft commands comprises:
selecting a particular aircraft command for a first aerial vehicle of the two or more aerial vehicles based at least in part on optimizing a useful life of the PTMS of a second aerial vehicle of the two or more aerial vehicles.

6. The system of claim 1, wherein the set of aircraft commands is a first set of aircraft commands and the operations further comprise:
detecting a change to the system state information for the network of aircraft during a first mission corresponding to the one or more mission objectives; and
determining a second set of aircraft commands for the two or more aerial vehicles based on the change to the state information for the network of aircraft;
wherein at least one aircraft command in the second set is different than an aircraft command of the first set for a corresponding aerial vehicle.

7. The system of claim 1, wherein:
determining a set of aircraft commands comprises determining a plurality of sets of aircraft commands;
generating the output signal comprises generating an indication of the plurality of sets of aircraft commands; and
the operations further comprise receiving a selection of a particular set of aircraft commands from the plurality of sets of aircraft commands and transmitting one or more signals identifying the particular set of aircraft commands.

8. The system of claim 7, wherein the operations further comprise:
receiving the set of aircraft commands by the network of aerial vehicles; and
operating the network of aerial vehicles to execute the particular set of aircraft commands.

9. The system of claim 1, wherein the operations further comprise:
receiving aircraft configuration data associated with the network of aerial vehicles;
wherein determining a set of aircraft commands is based at least in part on the aircraft configuration data.

10. The system of claim 1, wherein the system state information for the network of aircraft is received at an interval.

11. The system of claim 1, wherein the operations further include:
transmitting the one or more output signals to the network of aircraft, and
wherein at least one aerial vehicle of the network of aircraft modifies one or more sub-systems of the at least one aerial vehicle in response to receiving one of the one or more output signals.

12. The system of claim 1, wherein the set of aircraft commands includes, for each of the two or more aerial vehicles, directed energy weapon use and preparedness.

13. A computer-implemented method of aircraft thermal management, comprising:
receiving, by one or more processors, a shared mission objective for a network of aircraft including two or more aerial vehicles, each aerial vehicle including a power-thermal management system (PTMS);
receiving, by the one or more processors for each of the two or more aerial vehicles, system state information including power thermal management system (PTMS) data, the PTMS data including temperature data associated with one or more sub-systems of the PTMS;
determining, by the one or more processors for each of the two or more aerial vehicles, one or more reference commands based on the shared mission objective and the system state information; and
transmitting, by the one or more processors to the network of aircraft, one or more signals identifying the one or more reference commands, wherein the reference commands include increasing or decreasing a flight speed based on an amount of thermal storage to be available to the at least one of the aerial vehicles at a point in a mission where directed energy weapons are to be used.

14. The computer-implemented method of claim 13, wherein:
the shared mission objective is a first shared mission objective;
receiving the first shared mission objective includes receiving a plurality of shared mission objectives including the first shared mission objective;
determining one or more reference commands for each of the two or more aerial vehicles comprises determining a first reference command for a first aerial vehicle based on PTMS data associated with a second aerial vehicle.

15. The computer-implemented method of claim 13, wherein the two or more aerial vehicles include a first aerial vehicle and a second aerial vehicle, and wherein:

the system state information indicates a larger availability of a weapons of a first type on the first aerial vehicle than the second aerial vehicle;

determining the one or more reference commands comprises determining one or more first reference commands for the first aerial vehicle based at least in part on increasing engine efficiency;

determining the one or more reference commands comprises determining one or more second reference commands for the second aerial vehicle based at least in part on optimizing thermal storage on the second aerial vehicle.

16. The computer-implemented method of claim 13, wherein the system state information is first system state information and the one or more reference commands are one or more first reference commands, the method further comprising:

receiving, by the one or more processors, updated system state information after transmitting the one or more signals;

determining, by the one or more processors, one or more second reference commands based on the updated system state information; and transmitting, by the one or more processors, one or more second signals identifying the one or more second reference commands.

17. The computer-implemented method of claim 13, wherein:

the system state information includes a current state of thermal energy storage associated with each of the two or more aerial vehicles.

18. The computer-implemented method of claim 13, wherein:

the system state information includes a current state of electrical and chemical energy storage associated with each of the two or more aerial vehicles.

19. A non-transitory computer-readable medium storing computer instructions, that when executed by one or more processors, cause the one or more processors to perform operations, the operations comprising:

receiving one or more shared mission objectives for a network of aircraft including two or more aerial vehicles, each aerial vehicle including a power-thermal management system (PTMS);

receiving system state information for the network of aircraft including state information for the two or more aerial vehicles, the state information including temperature data associated with one or more sub-systems of the PTMS;

determining first and second aircraft mission plans for the network of aircraft based on one or more shared mission objectives and the system state information, the set of aircraft objectives including for at least one of the two or more aerial vehicles a PTMS objective based on the one or more shared mission objectives for the network of aircraft, wherein the PTMS objective includes a target amount of thermal storage for a particular point in a mission where directed energy weapons are to be used for at least one of the aerial vehicles in the network of aircraft; and generating an output signal based on the selection of the first or the second mission plan for the network of aircraft.

20. The non-transitory computer-readable medium of claim 19, wherein the set of aircraft objectives is a first set of aircraft objectives and the operations further comprise:

detecting a change to the state information for the network of aircraft during a first mission corresponding to the one or more shared mission objectives; and determining a second set of aircraft objectives for the network of aircraft based on the change to the state information for the network of aircraft;

wherein at least one aircraft objective in the second set is different than an aircraft objective of the first set for a corresponding aerial vehicle.

\* \* \* \* \*